(12) United States Patent
Tamazato

(10) Patent No.: US 11,748,836 B2
(45) Date of Patent: Sep. 5, 2023

(54) CONSTRUCTION SITE SAFETY MANAGEMENT APPARATUS

(71) Applicant: TOTALMASTERS CO., LTD., Kuwana (JP)

(72) Inventor: Yoshinao Tamazato, Kuwana (JP)

(73) Assignee: TOTALMASTERS CO., LTD., Kuwana (JP)

( * ) Notice: Subject to any disclaimer, the term of this patent is extended or adjusted under 35 U.S.C. 154(b) by 207 days.

(21) Appl. No.: 17/133,099

(22) Filed: Dec. 23, 2020

(65) Prior Publication Data
US 2021/0295460 A1 Sep. 23, 2021

(30) Foreign Application Priority Data
Mar. 19, 2020 (JP) ................................ 2020-050057

(51) Int. Cl.
*G07C 5/00* (2006.01)
*G07C 3/00* (2006.01)
(Continued)

(52) U.S. Cl.
CPC ............ *G06Q 50/265* (2013.01); *G06F 3/14* (2013.01); *G06K 7/10297* (2013.01);
(Continued)

(58) Field of Classification Search
CPC ............ G06Q 50/265; G06Q 10/0635; G06Q 10/103; G06Q 10/105; G06Q 50/08;
(Continued)

(56) References Cited

U.S. PATENT DOCUMENTS 8,280,621 B2 * 10/2012 Edwards ............... G01S 13/931
342/70
2007/0255498 A1 * 11/2007 McDaniel ............. G01S 13/931
340/436
(Continued)

FOREIGN PATENT DOCUMENTS

EP  3919692 A1 * 12/2021 ............ E02F 9/2228
GB  2459880 A  * 11/2009 ................ E02F 9/24
(Continued)

OTHER PUBLICATIONS

Aug. 11, 2020 Office Action issued in Japanese Patent Application No. 2020-050057.
(Continued)

*Primary Examiner* — Yonel Beaulieu
(74) *Attorney, Agent, or Firm* — Oliff PLC

(57) ABSTRACT

A construction site safety management apparatus which is wirelessly communicatively connected with a positioning device or a distance measuring device, the apparatus including a recognition unit for appropriately recognizing respectively mutual positions among the one or more construction machines and, the installation objects or the workers, based on positional information transmitted from the positioning devices and/or distance information transmitted from the distance measuring devices, and a judgement unit for judging mutual proximity among the one or more construction machine and, the installation objects or the workers, based on roles of the installation object and/or the workers preliminarily set for the said one or more of the construction machines, while searching said recognized mutual positions among the one or more construction machine and, the installation objects or the workers, thereby performing centralized control of safety of the construction site.

8 Claims, 13 Drawing Sheets

(51) Int. Cl.
  *G08B 21/00* (2006.01)
  *G08B 21/22* (2006.01)
  *G07C 1/10* (2006.01)
  *G06Q 50/08* (2012.01)
  *G06Q 50/28* (2012.01)
  *G06F 3/14* (2006.01)
  *G06Q 50/26* (2012.01)
  *G08B 21/02* (2006.01)
  *G06Q 10/105* (2023.01)
  *G06K 7/10* (2006.01)
  *G06Q 10/10* (2023.01)
  *G06Q 10/0635* (2023.01)
  *G06K 19/07* (2006.01)
  *G07C 5/08* (2006.01)
  *G01S 19/46* (2010.01)
  *G01S 19/47* (2010.01)

(52) U.S. Cl.
  CPC ..... *G06K 19/0723* (2013.01); *G06Q 10/0635* (2013.01); *G06Q 10/103* (2013.01); *G06Q 10/105* (2013.01); *G06Q 50/08* (2013.01); *G06Q 50/28* (2013.01); *G07C 1/10* (2013.01); *G07C 3/00* (2013.01); *G07C 5/008* (2013.01); *G07C 5/0825* (2013.01); *G08B 21/02* (2013.01); *G08B 21/22* (2013.01); *G01S 19/46* (2013.01); *G01S 19/47* (2013.01); *G05B 2219/50193* (2013.01)

(58) Field of Classification Search
  CPC .......... G06Q 50/28; G06F 3/14; G06F 3/147; G06K 7/10297; G06K 19/0723; G07C 1/10; G07C 3/00; G07C 5/008; G07C 5/0825; G08B 21/02; G08B 21/22; G01S 19/46; G01S 19/47; G01S 11/06; G05B 2219/50193; G05B 19/4185; G05B 2219/31088; F16P 3/147; B64C 39/02; B64C 39/024; G05D 1/00
  See application file for complete search history.

(56) References Cited

U.S. PATENT DOCUMENTS

| 2016/0292920 | A1* | 10/2016 | Sprock ................... G06T 13/20 |
| 2020/0074383 | A1* | 3/2020 | Smith ............ G06Q 10/063114 |
| 2020/0080851 | A1* | 3/2020 | Edwards ............. G01C 21/3407 |
| 2021/0148063 | A1* | 5/2021 | Repiscak .............. E01C 23/088 |
| 2022/0259822 | A1* | 8/2022 | Subramanian .......... E02F 9/205 |

FOREIGN PATENT DOCUMENTS

| JP | H11-160068 A | 6/1999 |
| JP | 2004-199243 A | 7/2004 |
| JP | 2007-026212 A | 2/2007 |
| JP | 2008-146302 A | 6/2008 |
| JP | 2008-291519 A | 12/2008 |
| JP | 2015-520848 A | 7/2015 |
| JP | 2016-038650 A | 3/2016 |
| JP | 2019-60108 A | 4/2019 |
| NO | 2017/170651 A1 | 10/2017 |

OTHER PUBLICATIONS

Response to Aug. 11, 2020 Office Action issued in Japanese Patent Application No. 2020-050057.
Sep. 8, 2021 Office Action issued in Japanese Patent Application No. 2020-050057.
Mar. 15, 2022 Office Action issued in Japanese Patent Application No. 2020-050057.

* cited by examiner

[FIG. 1]
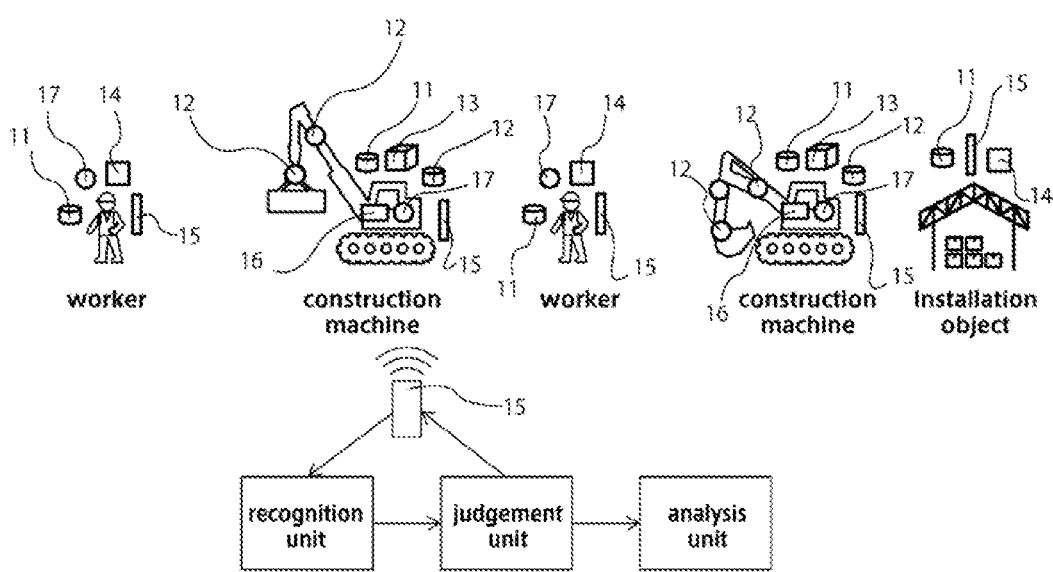

[FIG. 2]
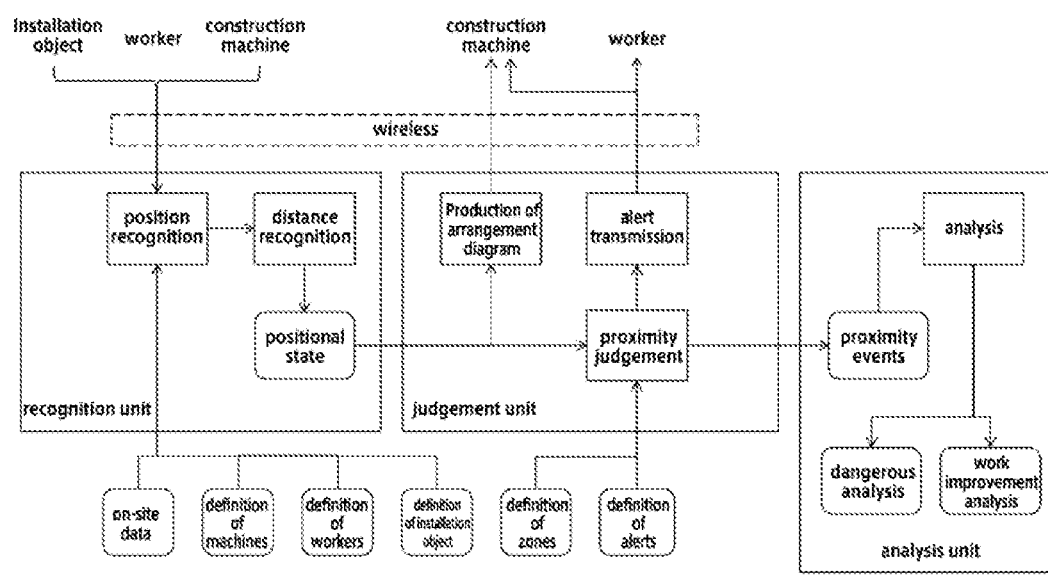

[FIG. 3]
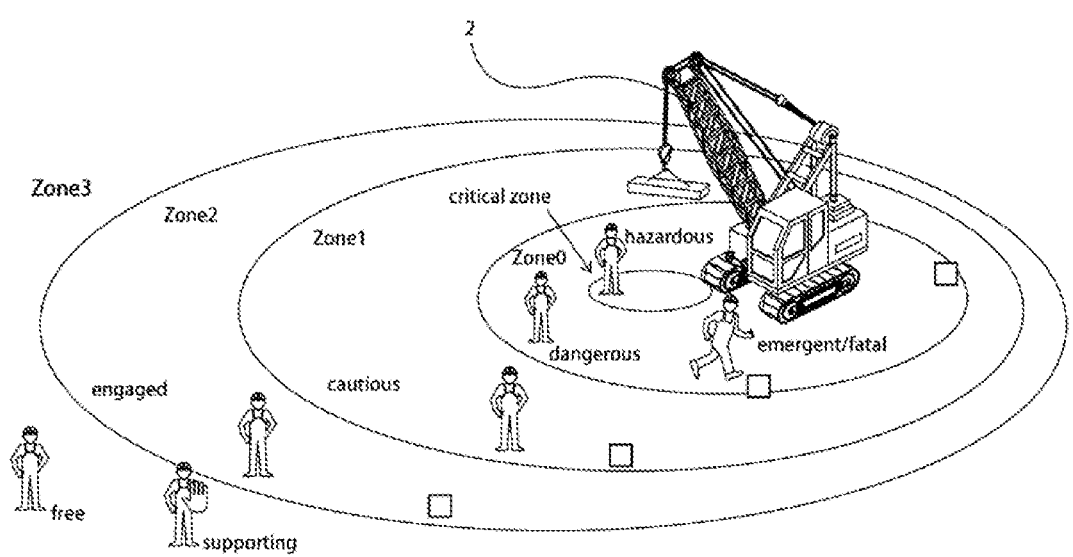

[FIG. 4]

| machine 1 | kind | definition of zones |
|---|---|---|
| machine 2 | crane | zone A |
| machine 3 | backhoe | zone B |
| machine 4 | backhoe | zone B |
| machine 5 | wheel loader | zone C |

[FIG. 5]

| zone A | area | quality of zones | allowed worker's role |
|---|---|---|---|
| CriticL Zone | worker's area | warning | machine handling |
| Zone 0 | area shape A | dangerous | work inside dangerous area |
| Zone 1 | radius of machine body 25m | cautious | work inside cautious area |
| Zone 2 | radius of machine body 35m | keep in mind | work in mind-keeping area |
| Zone 3 | others | outside area | outside work |

[FIG. 6]
area shape A
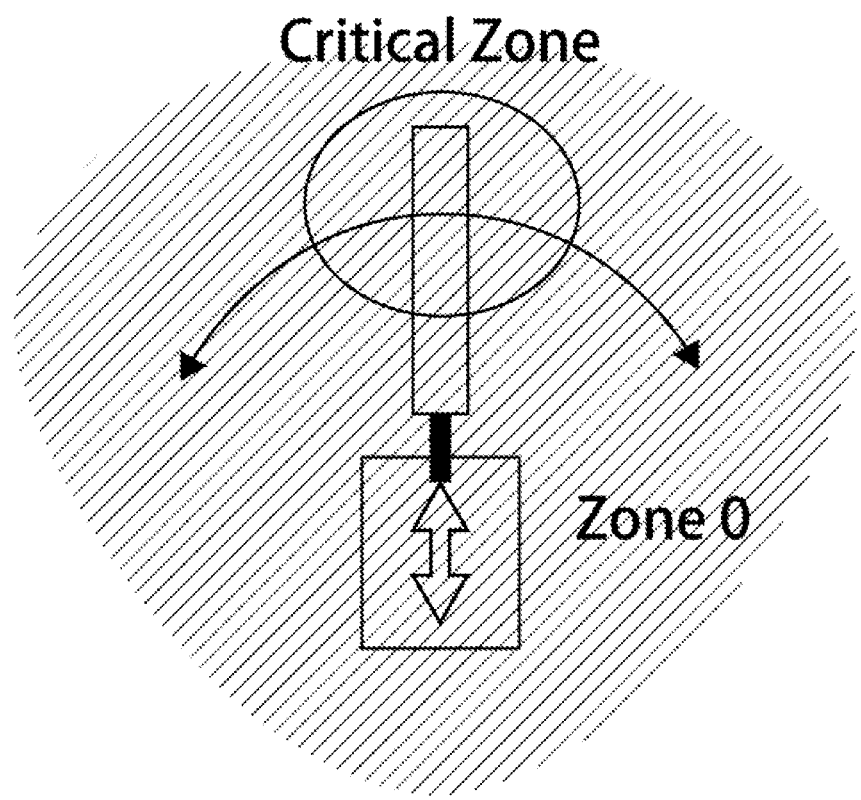
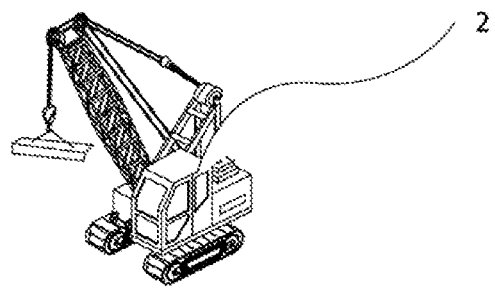

[FIG. 7]
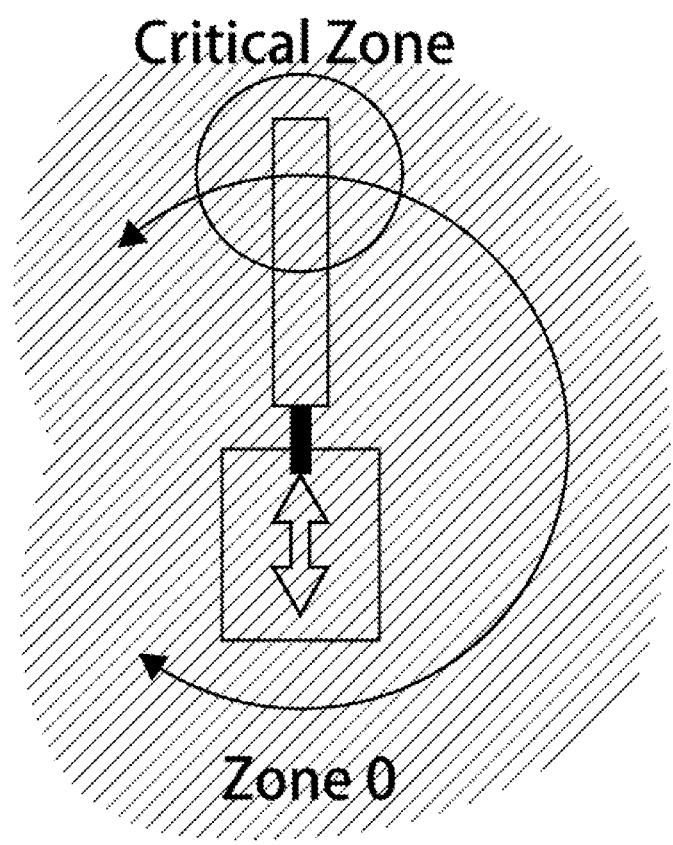
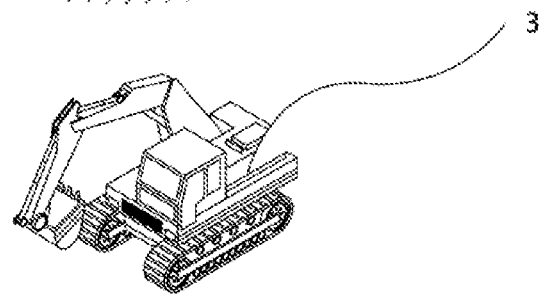

[FIG. 8]

| worker | machine | role |
|---|---|---|
| worker 1 | machine 1 | machine handling |
| worker 2 | machine 2 | work indie cautious area |
| worker 2 | machine 3 | work indie cautious area |
| worker 3 | machine 4 | work inside dangerous area |

[FIG. 9]

| event | zone | worker's role | kind of alert | action |
|---|---|---|---|---|
| hit | all | all | fatal | alarm F, stopping machine |
| operating_critical | critical zone | machine handling | hazardous | alarm H, machine speed down |
| approching | zone 0 | machine handling | strong warning | alarm S, machine speed down |
| approching | zone 0 | above & others | emargent | alarm E, stopping machine |
| staying | zone 0 | work inside dangerous area or more | warning | alarm W |
| staying | zone 0 | above & others | dangerous | alarm W, machine speed down |
| staying | zone 1 | work indie cautious area | cautious | alarm C |
| staying | zone 1 | above & others | evacuate | alarm V |
| staying | zone 2 | work indie mind-keeping area | ebgaged | alarm C |
| staying | zone 2 | above & others | evacuate | alarm V |
| free or supporting | zone 3 | outside work | nothing | nothing |
| staying | zone 3 | above & others | evacuate | alarm V |
| crossing | to inner zone | all | aware 1 | alarm I |
| crossing | to outer zone | all | aware 2 | alarm O |

[FIG. 10]

| installation object | machine | role |
|---|---|---|
| installation object 1 | machine 1 | machine handling |
| installation object 2 | machine 2 | others |
| installation object 3 | machine 3 | others |

[FIG. 11]

| event | zone | role of installation object | kind of alert | actions |
|---|---|---|---|---|
| hit | all | all | fatal | alarm F, stopping machine |
| operating_critical | critical zone | machine handling | hazardous | alarm H, machine speed down |
| approching | zone 0 | machine handling | strong warning | alarm S, machine speed down |
| approching | zone 0 | above & others | emargent | alarm E, stopping machine |
| others | zone1 and outside | all | nothing | nothing |

[FIG. 12]
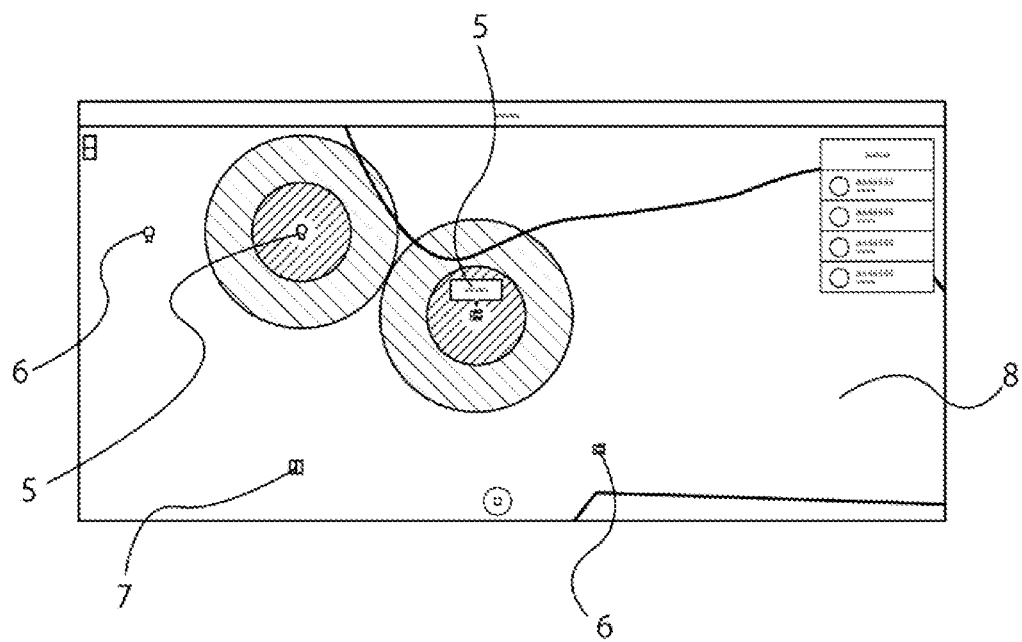

[FIG. 13]
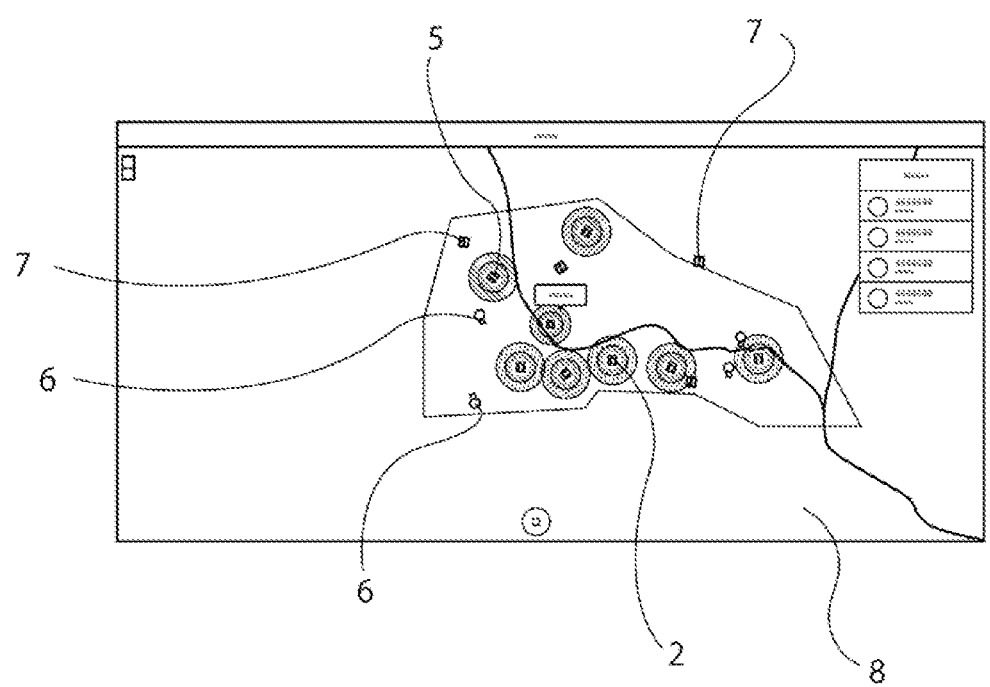

CONSTRUCTION SITE SAFETY MANAGEMENT APPARATUS

TECHNICAL FIELD

The present invention relates to work safety management for construction machines and construction workers at construction sites, and especially, this application relates to a safety management apparatus and its system in a centralized management function division of a construction site by using position measurement with a precision positioning device.

BACKGROUND

Generally, the adjustment of works between construction machines and workers needs to be carried out at construction sites and other worksites, so that safety works must be ensured by preventing mutual collisions and contacts between the construction machines and that workers that move freely with each other. And, the situation of the work site changes every moment according to the progress of the working, including the installation, etc. At such construction sites, workers and construction machines must be constantly managed safely, and various proposals have been made to the techniques and technology by the prior literatures as described below.

For example, Patent Document 1 discloses a technical idea related to a work safety management and instruction notification system, which is characterized by comprising one or more IDTAGs for specified work objects, TAG readers that are carried with the working persons or attached to such as a work place, a work machine, objects in use for the works such as tools, etc., and a local processing device accompanying the IDTAGs and adapted to output a response upon receipt of data including recognition code read in by TAG reader. The IDTAGs are also attached to the work place, the work machine, the objects in use for the works such as tools, etc., the working persons such as a worker, a person responsible for the work, etc., TAG reader receives the data including the recognition code and reads data including the recognition code of the IDTAG through radio waves or electromagnetic coupling.

However, in this case, the technical idea is mainly based on reading the data given to IDTAG sequentially with the reader, but it is not a system which manages the safety of the entire work site by accurately recognize basic workers and machines from a higher perspective.

In other words, it does not provide a fundamental solution to the problem of on-site safety management.

Further, Patent Document 2 discloses a technical idea relating to a GPS-utilizing moving body safety managing system, which comprises GPS positioning devices attached to respective mobile bodies in the monitoring area, transmitters that deliver respectively discrete mobile positional signals including positions provided by the positioning devices and identification signals for the mobile bodies (a receiver provided in the management room for receiving the discrete mobile position signals, assignment means for assigning a predetermined approach detection area around the position of the mobile bodies received, crossing detecting means for outputting crossing detection signals and the crossing mobile bodies by detecting mutual crossing between proximity detected moving objects and a notification device for sending a crossing notification signal including the crossing detection signal and the identification signal of the moving objects according to the crossing) and an intersecting receivers mounted on the respective moving bodies and detecting the said crossing notification signal including the identification signal of the moving bodies.

However, even in this example, the position measurement can be accurately made in the field, and alerting can be made for safety, but it has not reached a centralized safety management system for the entire construction site, which performs overall management of the entire construction site, analyzes the behavioral characteristics of workers, the types of work machines, the operating characteristics, and the hazards including the movements of various tools, and automatically interlocks with the work improvement.

PRIOR ART DOCUMENTS

Patent Document

[Patent Document 1] JP-A-2008-146302
[Patent Document 2] JP-A-1999-160068

SUMMARY OF THE INVENTION

Problems to be Solved by the Invention

In the past technique or technical idea, there were big problems in the field safety management in case that the positions of a worker (construction worker) and, the installation objects and a moving body such as the working machine at a given location (construction site) are managed, so particularly contact incident is to be avoided by managing the proximity state of the worker, the installation object and the mobile body. There were technical problems in a method of notifying the state of their proximity depending on the distances among the worker and the installation object and the operating body, or in a method for classifying areas or setting areas for the operating body depending on the type of the operating body and grasping the distance between the operation body and worker depending on areas.

Items described in the present invention will be as follows. Installation objects are materials, scaffolding, electric wires, work laboratories, storage, and other existing structures.

For example, they mean bridges, soundproof walls, utility poles, etc. Thereafter, they are collectively referred to as "installation objects."

In addition, in the past technique or technical philosophy, there are many insufficient and unclear mechanisms for changing the type of notification, etc. in the state of close proximity, depending on the role of the worker with respect to the operation body or the nature of the installation object. For the types of notification, including alerts, etc., it was necessary in the field, but the response was lacking. In addition, the prior art has not reached the technical idea that safety is ensured in advance by identifying a worker who can induce close proximity, or safety is ensured in advance by identifying operators of operating bodies such as working machines who can induce close proximity, according to the working history for the proximity, for example. The technology idea of ensuring the safety in advance has not been reached. These concepts are based on the history of proximity to each other to set work lines and work areas that are easy to avoid proximity to each other. Or, it is important for basic safety measures such as improving the layout of the installation.

And, there is a technology to measure the distance with sensors and radio waves in the technique in the conventional safety management. This is a technique that proximity is grasped by measuring a distance with sensors and detectors installed in the worker and the machine, ultrasonic distance measurement, distance detection with RFID, generating and detecting magnetic fields, and radio wave detection, so that an alarm is sounded, or alarm is made by lighting or color development of a lamp attached in a driver seat of a machine or a helmet.

In the conventional safety management method, a method is also available to grasp the state of proximity by image recognition. This is a method in which workers, installation objects, and machines are photographed with a camera mounted on the site, or workers and installation object are photographed with a camera installed on the machine. It is a method for judging the possibility of contact by image recognition and alarming in the same manner as described above. As a method of mechanically restricting operation, there is also a method to avoid contact with pedestrians, electric wires, or other existing structures on a pedestrian walkway by mechanically or electrically controlling the operation of the machine. In a fundamental method, signs, fences, nets, cones, etc. are used to attract attention, so that the worker or the machine operator is made to recognize the contacting target and avoid the contact.

However, in the conventional technique and the prior art as described above, for example, the detection with sensors or radio waves has a false detection or detection leakage.

Erroneous measurement may be made with the ultrasonic sensors in rainy weather, and it is difficult to grasp distances with radio waves. And, in image recognition, false recognition occurs by lighting conditions such as dusk, backlight, and light and dark contrast. Mechanical restrictions require time and effort to set each time and are difficult to handle according to the distance. People's attention is limited in the prevention of danger generation in the recognition of people.

With distance-based alarms, if a worker works near a machine, for example, when he hangs a suspension object on a hook of a crane, or if the machine approaches a material storage area, alarms are given despite of necessary works, and do not become appropriate alarms.

Although it is a very dangerous act, because of the audibility of the alarm, there are frequent situations that must be avoided, such as switching off the alarm.

The present invention is intended to solve such prior art problems, and wishing to avoid accidents involving contacts between the construction workers and the construction machine at construction sites, and wishing to avoid the construction machine coming into contact with non-human structures and installation objects, what is the most effective safety system for that purpose is considered. In addition, there is a tendency for specific workers and machine operators to have a higher possibility of contact. It is desired to identify such workers and operators and lead them to safe work. Regarding the moving lines of the worker and the moving lines of the machines and the locations of installation objects, the present invention has been made to solve the problems and the objects that safe and more effective working procedures and a method of arranging the workers, the machines and the installation objects are to be found out by accumulating and analyzing data on proximity.

Measures for Solving the Problem (1) To solve such problems, the construction site safety management apparatus according to the present invention,
(1) a construction site safety management apparatus that is wirelessly communicatively connected with a positioning devices and/or a distance measuring devices provided respectively in one or more construction machines and, installation objects or workers at a construction site, is characterized in that said apparatus comprises a recognition unit for appropriately recognizing respectively mutual positions among said one or more construction machines and, the installation objects or the workers, based on positional information transmitted from the positioning devices and/or distance information transmitted from the distance measuring devices, and a judgement unit for judging mutual proximity among said one or more construction machine and, and said installation objects or said workers, based on roles of the installation object and/or the workers preliminarily set for the said one or more of the construction machines, while searching said recognized mutual positions among said one or more construction machine and, said installation objects or said workers, wherein said judged proximities are transmitted to said one or more construction machines or said workers, thereby performing centralized control of safety of said construction site.

(2) Further, the construction site safety management apparatus according to the present invention, is characterized in that information on zones corresponding to levels of distanced from said one or more construction machines is preliminarily set for a type or types of for said one or more construction machines, and said proximity is judged, based on said information on the zones and a working role for dangerous levels set for each of the workers.

(3) Then, in the construction site safety management apparatus according to the present invention, alert information may also be transmitted to said one or more construction machines or the workers, based on the information on the zones, the information on said working roles for dangerous levels set for each of the workers, and the information on the preset alert.

(4) As a detailed configuration of the apparatus, the positioning device comprises a GNSS receiver (world geodetic system positioning device) and IMUs (inertial measuring device, an angular sensor), and the distance measuring device may take the form of an RFID tag or an RFID detector.

That is, the construction site safety management apparatus according to the present invention comprises, for example, GNSS receivers (world positioning geodetic system positioning device) to be installed on the construction machines and, the installation object or the workers at construction sites, a radio and a RFID tag or RFID detector, IMU (inertial measuring device, an angle sensor) installed in the construction machine, a functional unit (managing functional unit) for processing information transmitted from GNSS receiver, the IMU and RFID detector and the radio, wherein the functional unit processes said information via the recognition unit, the judgement unit and the analysis unit, based on condition information set in advance, which can be transmitted as information to said construction machine and said worker. A speaker may be installed in the radio, and monitors may be installed in construction machine and the construction site safety management apparatus.

(5) In addition, a first information display device is installed in said one or more construction machines, an arrangement diagram regarding said one or more construction machines and, said installation objects or the workers is produced from information on the relationship with respect to the specified positions, and the information on said roles, wherein the arrangement diagram, the information on said one or more construction machines and, the installation object or the workers displayed on the arrangement diagram, information regarding the proximity relating to them and said alert information can be transmitted to an information display device of said one or more construction machines.

(6) In addition to the above, in the construction site safety management apparatus according to the present invention, the judged proximity, and the produced alert information, the information on said one or more of the construction machine and, the installation and/or the workers relating thereto are recorded as proximity information, and a work plan to avoid the hazard can be presented based on the recorded proximity information by analyzing the proximity of the proximity information on said one or more construction machines and, the installation object or the workers and the situation of the number, location, and time for each alert.

(7) According to said work plan to avoid the said hazard, any worker and/or said one or more construction machines who exceeded a threshold of the preset hazard level can be identified.

(8) The monitor is mentioned above. The construction site safety management apparatus according to the present invention, is characterized in that in addition to said one or more construction machines a second information display unit (monitor) is also installed in the functional unit of the construction site safety management apparatus, so that a bird's-eye view is displayed in the information display device, showing the positions of said one or more construction machines and, the installation object or the workers and the zones for the respective hazard levels. The reference to the bird's-eye view in the field is an indispensable element for the safety management.

Then, the present invention also claims as its right scope a method in the construction site safety management used in the construction site safety management apparatus described so far. In addition to the above contents, there is also a doctrine of equivalent technique that can be implemented by various modifications within the scope not departing from the gist of the present invention. It is claimed that all of these forms are within the scope of this technical idea.

Effect of the Invention

According to the present invention, the following become possible:

It is possible to grasp the role of the worker for the construction machine, and carry out appropriate alert transmission or make alert as necessary, when introducing a device that avoids contact between workers and construction machine, instead of measuring distances uniformly and issuing a warning, In a case of working facing the construction machine, it is easier to prevent the alarm from unnecessarily turning off the power as noisy.

More accurate hazard recognition and alerting become possible by introducing the classification according to the distances to construction apparatus.

More accurate alarm transmission is possible by combining the role of workers with classification, while eliminating unnecessary alarms. In addition, it is possible to avoid the danger well beforehand by drawing attention when the worker enters a division beyond the role.

If it is reasonable for the construction machine to touch the installation object, no alert is triggered by assigning a role to the installation object, so that it is possible to avoid the danger with the installation object accurately.

Similarly, according to the invention, the following also become possible.

By recognizing the positions of the workers and the machine via satellite positioning, radio positioning, image recognition or the like, the mutual position can be grasped with a of higher precision, and the danger can be grasped with an increased accuracy. Furthermore, by combining with a higher accuracy distance measurement with such as RFID, range sensors, and image recognition, low-cost and high precision distance judgement can be made when applying a high precision method to only one with a close mutual distance together.

By recording and analyzing events at close proximity leading to an alert, workers and construction machine operators that are prone to cause alarm events or are prone to be subject to alarm events can be identified. In addition to alerting these workers and operators, instructions for education, etc. may be effectively provided as necessary.

By analyzing the trend of the proximity events leading to alerts, it becomes easy to arrange workers and construction machines where alert events are unlikely to occur, and to set the zones. This leads to improvement of the safety environment at the site and increase of the productivity of the construction work.

As described above, the present invention provides a safety management system, which avoids a contact accident between a construction worker and a construction machine at a construction site, and avoids contact of the construction machine with non-human structures and installation object. Regarding the moving lines of the workers or the machine and the installation location of the installation object, safer and more efficient work procedures and a method for arranging workers, machines, and installations object are led by accumulating and analyzing data on proximity, thereby the safety management system for work sites can be provided.

Therefore, while significantly improving the safety and workability of construction sites, the construction site safety management apparatus and system capable of remarkably improving economic efficiency can be realized.

BRIEF DESCRIPTION OF THE DRAWINGS

FIG. 1 is a conceptual diagram showing an entire image of a construction site safety management apparatus according to an embodiment of the present invention.

FIG. 2 is a block diagram showing an overall functional image of the construction site safety management apparatus according to an embodiment of the present invention.

FIG. 3 is a conceptual diagram showing a crane work image of the construction site safety management apparatus according to an embodiment of the present invention.

FIG. 4 is a conceptual table showing examples of the machine definition of the construction site safety management apparatus according to an embodiment of the present invention.

FIG. 5 is a conceptual table showing examples of the zone definition of the construction site safety management apparatus according to an embodiment of the present invention.

FIG. 6 is a conceptual diagram showing examples of the zone area definition of the construction site safety management apparatus according to an embodiment of the present invention.

FIG. 7 is a conceptual diagram showing examples of the zone area definition of the construction site safety management apparatus according to an embodiment of the present invention.

FIG. 8 is a conceptual table showing examples of the worker definition of the construction site safety management apparatus according to an embodiment of the present invention.

FIG. 9 is a conceptual table showing examples of the alert definition of the construction site safety management apparatus according to an embodiment of the present invention.

FIG. 10 is a conceptual table showing examples of definition of installation objects of the construction site safety management apparatus object definition according to an embodiment of the present invention.

FIG. 11 is a conceptual table showing examples of the alert definitions of the construction site safety management apparatus according to an embodiment of the present invention.

FIG. 12 is a conceptual diagram showing a display image of a monitor in the construction site safety management apparatus according to an embodiment of the present invention.

FIG. 13 is a conceptual diagram showing a display image of a monitor in the construction site safety management apparatus according to an embodiment of the present invention.

DESCRIPTION OF SYMBOLS

1—Construction machine
2—Crane
3—Backhoe
4—Wheel loader
5—Bulldozer
6—Worker
7—Installation objects (installation objects, sheds, materials, wires, etc.)
8—Construction site
11—GNSS receivers (Global Navigation Satellite System/global positioning satellite-system receivers)
12—IMU (Inertial Measurement Unit, Inertia measuring device) angle sensor
13—RFID detector (radio frequency identifier)
14—RFID tag
15—Radio equipment
16—Monitor
17—Speaker
18—Functional unit
19—Recognition unit
20—Judgment unit
21—Analyze unit

EMBODIMENTS FOR CARRYING OUT THE INVENTION

Hereinafter, explanation will be given to embodiments of the present invention with reference to the drawings. Incidentally, the following schematically shows the range necessary for explanation for achieving the object of the present invention, and mainly explains the range necessary for description of the corresponding portions of the present invention, while portion to be omitted shall belong to the known art.

FIG. 1 is a conceptual diagram showing an entire image of a construction site safety management apparatus according to an embodiment of the present invention. As shown in the figure, a GNSS receiver 11, an IMU 12, an RFID detector 13, a monitor 16, a radio 15, and a speaker 17 are installed in a crane 2 which is a construction machine in a construction work site. The construction machine may be a backhoe, a bulldozer or the like in addition to the crane. The number of construction machines may be one or more. The worker 6 is provided with a GNSS receiver 11, a RFID tag 14, a radio 15, and the speaker 17. One or more workers may be. The above devices attached to the worker may be mounted on a helmet, or may be attached in the form of a worker safety belt.

Here, RFID detector (radio frequency identifier) refers to a device that exchanges information from an RF tag with embedded ID information via radio communication over a short distance (several centimeters to several meters depending on the frequency band) using electromagnetic fields, radio waves, etc., and refers to the general technology.

As shown in FIG. 1, there are one to more installation objects (arranged objects) at the construction site. Installation objects include, for example, many kinds of sheds, construction materials, electric wires, and the like. In the installation objects, the GNSS receivers 11, the RFID tags 14 and the radios 15 are installed. Further, a functional unit for performing centralized management control of the construction site safety management apparatus according to an embodiment of the present invention is provided in the construction site. The functional unit has a functions for a recognition unit, a judgement unit, an analysis unit and the like, and is also provided with the radio 15. The functional unit will be described later with reference to FIG. 2.

The IMUs (Inertial Measurement Unit, inertial measuring equipment), which are angle sensors, are also mounted on supports of a crane, an arm and a bucket of a backhoe, and others as working tools of the construction machines, so that the position of the work tools can be accurately grasped even during driving.

FIG. 1 shows a GNSS receiver, which grasps positions of the workers and the construction machine and the rough gross positions of installed objects. For example, it may be one using RTK with high precision.

RTK is an abbreviation of Real Time Kinematic, the RTK positioning uses two receivers: a fixed station (reference station) and a mobile station, and this method enhances positioning accuracy by exchanging differential information between two points in real time.

Some reference stations provide differential information over a network, particularly called Virtual Reference Station, or virtual reference points (VRSs).

RFID shown in FIG. 1 is preferably a long range, and a more precise spacing between RFID detector 13 and RFID tag 14 can be measured. Of course, the distance may be measured by other methods such as image recognition or an ultrasonic range finder with a camera. If the GNSS (Global Geodetic System) provides sufficient accuracy, only GNSS is required.

As long as the installation object is fixed like a shed, only RFID tag 14 may be attached, and the position may be set in advance in the position recognizing unit of the functional unit. The detailed distance is measured by a detector of the machine.

The position of the construction machine and that of the moving worker can be recognized through grasping the position and the attitude of the machine body with the GNSS receiver 11 and IMU 12 installed on the construction machine. The position of the working tool can also be recognized. The positions of the worker and the installation object can be recognized with the GNSS receiver 11 mounted on the worker and the GNSS receiver 11 installed on the installation object. The distance between the construction apparatus and the worker or the installation object can be measured through the detection of the RFID tag 14 mounted on the worker and the RFID tag 14 installed on the installation object with the RFID detector 13 installed on the construction apparatus. The recognition unit receives the position information and the distance information from the construction machine, the workers and the installation objects via the radio 15 as appropriate, so that their current positions and the mutual distances between them can be grasped.

The judgement unit determines the degrees of mutual proximity by a predetermined method, respectively, issues an alarm if necessary, and inform the workers and the operator of the machine. The analysis unit analyzes the history of the proximity, so that hazard analysis and work improvement analysis can be performed.

The method of measuring the distances among the construction apparatus and the worker or installation is not particularly limited, For example, it may be that after a specified low-power transmitter is installed in a construction machine and a specified low-power receiver is installed in a worker or installation, the receiver receives the strength of radio waves emitted from the transmitter at the receiver, and recognizes the distance, and the recognition unit receives the distance from the receiver installed on the worker or the installation object via the radio 15 as appropriate, so that the distance among the construction machine and the worker or the installation object may be recognized.

FIG. 2 is a block diagram illustrating an overall function image of the construction site safety management apparatus according to an embodiment of the present invention. As shown in the figure, in order to manage the construction machine, the installations object, workers, etc. in the site and those present in the site, the recognition unit can appropriately grasp their positions and the mutual distances received through the radio. From their positions and the mutual distances, the recognition unit can recognize those that is within a certain distance in the work site. The mutual positions among the construction machine, the installation objects, and the workers, which change as appropriate over time, shall be controlled as positional state.

As shown in FIG. 2, the determination unit send a surrounding bird's-eye view to a monitor in each machine as an arrangement generation plan, depending on the positional state from the recognition unit. While the determination unit is searches for the mutual positions among the construction apparatus, the installation objects, and the workers to be managed in the positional state, it determines the proximity among the construction machine, the installation objects, the workers, etc. based on each of the definition data described later.

Then, it is possible to transmit an alarm to the worker or construction machine which is as a target, if necessary.

As shown in FIG. 2, the analysis unit records an event related to the proximity determination of the judgement unit as a proximity event, and performs analysis and analysis.

The contents of the analysis include hazard analysis and work improvement analysis. This will enable one to create a work plan that can avoid danger by identifying and clarifying dangerous workers and dangerous operators of the construction machine.

FIG. 3 is a conceptual diagram illustrating a crane work image in the construction site safety management apparatus according to an embodiment of the present invention. In the figure, the situation around the construction site in the construction work of the crane 2, for example, a work machine.

As shown in FIG. 3, in the construction site safety management apparatus of the present invention, it shows an image of setting zones in hierarchical areas centering on crane 2 as an example of the construction machine. The zones can be set according to the characteristics of the machine, such as how the machine moves and what a range is dangerous, and the shape of the site and the classification of works. Roles are assigned to the workers in each zone. Especially important are in the safety working whether or not a worker has a work to be done for the workers on construction machine. In the construction site safety management apparatus according to an embodiment of the present invention, the positions of workers, installations, and construction machine should be grasped as appropriate, the mutual distance is measured. As a matter of course, the zones moves with the movement of the construction machine. They move, while being deformed in some cases.

FIG. 3 shows an example for the crane 2, which is a single machine, but multiple construction machine may overlap. In this case, it is possible to make judgment for each machine zone. The construction site safety management apparatus according to an embodiment of the present invention can generate a predetermined alert to those within a certain distance, a zone or a worker there and an installation object there by determining the degree of proximity according to their role.

FIG. 4 is a conceptual table showing an example of a machine definition of the construction site safety management apparatus according to an embodiment of the present invention. As shown in the table, construction machines are defined for respective type of construction machines, such as cranes, backhoes, and wheel loaders, for example, or for respective sizes and capacities thereof, and zone definitions are assigned to each of them.

Zone A, Zone B, Zone C, etc. as zone definitions, will be described later, and is further subdivided and defined. The zone definitions means area definitions according to the hazard levels centering on the construction machine as shown in FIG. 3.

FIG. 5 is a conceptual table showing an example of the zone definitions of a Construction site safety management apparatus according to an embodiment of the present invention. The table shows examples of the zone definitions.

For example, it shows a zone A as zone definitions of a crane which is a machine 1 shown in the table of FIG. 4. In Zone A, the areas from the construction machine and corresponding to that construction machine, and the nature of the zones, the role of the workers allowed, etc. are defined. The level of danger are evaluated and defined from the roles of the construction machine and the workers, and the work area is also defined by dividing it as in zones 0 to 1, 2, 3, 4 corresponding to the distance from the work machine and according to the hazard levels FIG. 6 is a conceptual diagram illustrating an example of zone area definitions of the construction site safety management apparatus according to an embodiment of the present invention. Similarly, FIG. 7 is a conceptual diagram illustrating example of zone area definitions of a construction site safety management apparatus according to an embodiment of the present invention. As shown in FIG. 3, the zone area definitions differ depending on the type of the construction apparatuses, FIG. 6 is directed to the construction machine crane 2, and FIG. 7 shows an example of the definition of the danger zone 0 for the construction machine backhoe 3. As shown in the figures, the area shapes differ depending on the construction machines For example, as shown in FIG. 6, a range in which critical zone of the crane with the movable tool of the crane 2 moves is defined as zone 0 and the area shape A with the highest hazard level. As shown in FIG. 7, a range in which critical zone an arm and a bucket as the movable tool of the backhoe 3 move are defined as zone 0 and the most dangerous area shape B.

FIG. 8 is a conceptual table showing examples of worker definitions of the construction site safety management apparatus according to an embodiment of the present invention. As shown in the table in FIG. 8, workers are classified as workers 1, 2, and 3, depending on the types of the construction machines they are facing and depending on the roles of the works, thereby defining them. In other words, the levels of hazard are classified according to each worker for the works.

FIG. 9 is a conceptual table showing examples of alarm definitions for a construction site safety management apparatuses according to an embodiment of the present invention. As shown in the table in the figure, in examples of the alert definitions, the alert events are defined according to target zones and the work roles of the workers in the target zone, and further, the alert types and their associated actions are defined for each alert event.

As shown in the tables in FIG. 9, for example, Alarm X indicates the type of alarm tone, which is the type of alert, in alphabetical letters. Depending on the types of alerts, the alarm will sound for each of the worker and the construction machine operator by changing the intensity and tone. The alarm may be accompanied by vibration.

As shown in the table of FIG. 9, these definitions are the most important and delicate dividing definitions of the construction site safety management apparatus according to one embodiment of the present invention. For example, Hazardous gives caution when performing tasks such as hanging wires on the crane hook, but not an even stronger stimulus alarm is issued. For example, Aware1, Aware2 or the like gives an alarm to make aware that it is across the zones. In other words, whether emergency evacuation is required, or whether the primary purpose is continuity of alerting, assuming a certain level of dangerous work, the definitions are delicately classified according to the types. Workers dislike continued alarm with a large volume, shutting off the alarm, continue workings. The above classification is an important approach to avoid such human-induced failures that may cause continuous work.

FIG. 10 is a conceptual table showing an example in the definitions of installation objects in a construction site safety management apparatus according to an embodiment of the present invention. As shown in the table in the figure, the installation objects include sheds for storing materials, machines and equipment, etc., and various items such as materials, electric wires, and other equipment located at the construction site, and each of them has a role. The definition of the installation is established according to the type of the installation, classification and classification of the construction machine involved, and the role of the installation.

FIG. 11 is a conceptual table showing an example of the definitions of alerts in the construction site safety management apparatus according to an embodiment of the present invention. As shown in the table in the figure, in the examples of the alert definition example defines, the alert events are defined according to target zones and roles of the installation objects in those zones. In addition, alert types and their associated actions are defined for each alert event. Zones are allocated for each event division of construction work. Alert types and their associated actions are defined according to the role of the installation.

FIG. 12 is a conceptual diagram illustrating a display image in a monitor of a construction site safety management apparatus according to an embodiment of the present invention. The figure shows an example of a display screen in a monitor installed in, for example, a cockpit in the construction machine at a work site. The operator of the construction apparatus can confirm the monitor as a bird's-eye view from the viewpoint of the operator, around the position of the own machine. The own machine is shown in the zone, workers 6 and installation objects 7 existing in its vicinity are also displayed. If there is a matter to do with the alert definition, an alarm will be sounded, while highlighting a worker 6 and an installation object 7 as targeted according to the content thereof, and an operator can be informed of that fact. The upper right of the monitor may be displayed, for example, a list of workers in the area and the details of the workers.

FIG. 13 is a conceptual diagram illustrating a display image of a monitor in a construction site safety management apparatus according to an embodiment of the present invention. The figure shows an example of a display screen of a monitor installed in a functional unit that performs centralized management control of the construction site safety management apparatus of the present invention. As the management screen of the entire construction site, a bird's-eye view of the whole construction site can be seen. Several construction machines working on site and their respective zones are displayed. And, the construction machines 2, the workers 6, and the installation objects 7 which exist in the entire construction site, are displayed. If there is a matter falling in an alert definition, while highlighting a worker 6, an installation object 7, and a construction equipment 2 as targeted according to its content, an alarm can be issued to inform such a worker and the operator of this fact.

The construction site safety management apparatus according to an embodiment of the present invention can perform various analyses in a specific system as described above.

For example, in event accumulation, when an event defined in the alert definition occurs, the site, that event and event-related data of the workers, the installation objects, the construction machine, and the zones and the alert, etc. are recorded.

Similarly, in the case of hazard analysis, the analysis unit analyzes the log of events, but the frequency of occurrence of alerts tends to cause alert events. Alternatively, in addition to identifying and alerting workers and operators who are likely to be subject to alert events, instructions for education, etc. may be given effectively as necessary. In addition, measures can be taken such as implementing measures that facilitate avoidance of alerts and allocating personnel.

As an analysis for improving the operation of the analyzer, and conditions prone to alert events can be sorted out by correlating the occurrence of events in a chronological order and grasping the conditions of event occurrence and the frequency of relationships with the positions and zones of the workers and construction machine. Then, the alert event is unlikely to occur based on this result, so that since it is possible to set the arrangement and zone of the workers and the construction machine, the safety environment of the construction site can be improved, and the productivity of the construction can be increased.

The present invention is not limited to the embodiments described above, and various modifications can be made without departing from the scope of the present invention. All of these forms are within the scope of this technical idea.

INDUSTRIAL APPLICABILITY

As described above, according to the invention in the present application, a safety management system can be provided, which avoids accidents involving contact between the construction workers and the construction machine at construction sites and is adapted to avoid the contact of the construction machine with non-human structures and the installation objects. Regarding the moving lines of the workers and the machine and the installation location of the installation objects, safer and more efficient work procedures and a methods for the placement of the workers, the machines, and the installation objects can be derived through accumulating and analyzing data on proximity, so that a safety management system for the work site can be provided.

That is, according to the invention in the present application, the safety management system capable of dramatically improving economic efficiency is realized, while significantly improving the safety and the workability in the construction sites.

The present invention is not limited to the civil engineering construction industry to carry out construction work, and it can be used and applied to applications of all construction works. Therefore, this application brings great benefits to various industries involving construction work.

What is claimed is:

1. A construction site safety management apparatus that is wirelessly communicatively connected to positioning devices and distance measuring devices provided respectively on (i) one or more construction machines and (ii) installation objects or workers at a construction site, wherein the apparatus comprising:
    a recognition unit for recognizing respective mutual positions among the one or more construction machines and the installation objects or the workers, based on positional information transmitted from the positioning devices and/or distance information transmitted from the distance measuring devices, the positional information being received from both (i) the one or more construction machines and (ii) the installation objects or the workers, wherein
    the recognition unit further recognizes respective mutual distances based on distance information received from the distance measuring devices only when the recognized mutual positions are within a first distance which is less than a second distance; and
    a judgement unit for judging mutual proximity among the one or more construction machines and the installation objects or the workers, based on roles of the installation objects and/or the workers preliminarily set for the one or more of the construction machines, while searching the recognized mutual positions among the one or more construction machines and the installation objects or the workers, and transmitting the judged proximity to the one or more construction machines or the workers,
    the apparatus thereby performing centralized control of safety of the construction site.

2. The construction site safety management apparatus according to claim 1, wherein information on zones corresponding to levels of distance from the one or more construction machines is preliminarily set for a type or types of the one or more construction machines, and the proximity is further judged based on the information on the zones and the role set for each of the workers for dangerous levels.

3. The construction site safety management apparatus according to claim 2, wherein alert information is transmitted to the one or more construction machines or the workers, based on the information on the zones, the information on the role set for each of the workers for the dangerous levels, and information on a preset alert.

4. The construction site safety management apparatus according to claim 3, wherein the positioning devices comprise a GNSS receiver (world geodetic system positioning device) and IMUs (inertial measuring device, an angular sensor), and the distance measuring devices take the form of an RFID tag or an RFID detector.

5. The construction site safety management apparatus according to claim 3,
    wherein a first information display device is installed in the one or more construction machines,
    an arrangement diagram regarding the one or more construction machines and the installation objects or the workers is produced from information on the relationship with respect to the mutual positions, and information on the roles, and
    wherein the arrangement diagram, information on the one or more construction machines and the installation objects or the workers displayed on the arrangement diagram, information regarding the proximity relating to them and the alert information are transmitted to the first information display device.

6. The construction site safety management apparatus according to claim 3, wherein
    the judged proximity, the alert information, and information on the one or more of the construction machines and the installation objects and/or the workers relating thereto are recorded as proximity information, and
    a work plan to avoid a hazard is presented based on the recorded proximity information by analyzing the proximity of the proximity information of the one or more construction machines and the installation objects or the workers and a situation of a number, location, and time for each alert of the alert information.

7. The construction site safety management apparatus according to claim 6, wherein according to the work plan to avoid the hazard, the workers and/or the one or more construction machines which exceed a threshold of a preset hazard level can be identified.

8. The construction site safety management apparatus according to claim 6, wherein a second information display device is installed on the construction site safety management apparatus, and a bird's-eye view is displayed on the second information display device, showing the positions of the one or more construction machines and the installation objects or the workers and the zones for the respective hazard levels.

* * * * *